United States Patent [19]
Lancy et al.

[11] Patent Number: 5,803,392
[45] Date of Patent: Sep. 8, 1998

[54] VACUUM BOX AND METHOD OF OPERATION FOR NON-CONTACT WEB TRANSPORT THEREIN

[75] Inventors: David Harold Lancy, Rochester; Frank Castrignano, Fairport; Thomas William Palone, Rochester, all of N.Y.

[73] Assignee: Eastman Kodak Company, Rochester, N.Y.

[21] Appl. No.: 745,075

[22] Filed: Nov. 7, 1996

Related U.S. Application Data

[63] Continuation of Ser. No. 337,356, Nov. 10, 1994, abandoned, which is a continuation-in-part of Ser. No. 169,445, Dec. 16, 1993, abandoned.

[51] Int. Cl.⁶ ................................................. B65H 20/30
[52] U.S. Cl. ................................. 242/417.1; 242/419.3; 226/97.2; 226/118.1
[58] Field of Search .......................... 242/417.1, 4, 18.1, 242/419.3, 334.3, 334.4, 396; 226/97.2, 95, 118.1

[56] References Cited

U.S. PATENT DOCUMENTS

| | | |
|---|---|---|
| 3,112,473 | 11/1963 | Wicklund et al. . |
| 3,217,956 | 11/1965 | Nejezchleb . |
| 3,266,691 | 8/1966 | Welsh . |
| 3,499,614 | 3/1970 | Badum . |
| 3,568,907 | 3/1971 | Watson . |
| 3,633,807 | 1/1972 | Williams . |
| 3,754,723 | 8/1973 | Meyer . |
| 3,863,863 | 2/1975 | Ende . |
| 4,052,022 | 10/1977 | Reijnhard . |
| 4,093,148 | 6/1978 | Urynowicz et al. . |
| 4,113,247 | 9/1978 | Phillips . |
| 4,331,306 | 5/1982 | Epina et al. . |
| 4,399,958 | 8/1983 | Dupont . |
| 5,079,569 | 1/1992 | Bunch, Jr. . |

FOREIGN PATENT DOCUMENTS

| | | |
|---|---|---|
| 2348267 | 4/1975 | Germany . |
| 4030462 | 4/1992 | Germany . |
| 6-115780 | 4/1994 | Japan . |
| 6/115780 | 4/1994 | Japan . |
| 666574 | 6/1979 | U.S.S.R. . |
| 975723 | 11/1964 | United Kingdom . |

OTHER PUBLICATIONS

C. Hawley, "Contoured Vacuum Column", IBM Tech. Discl. Bul., vol. 17, No. 9, Feb. 1975, p. 2567.

V. Nejezchleb, "Decreasing Tape Wear", IBM Tech. Discl. Bul., vol. 5, No. 2, Jul. 1962, p. 11.

*Primary Examiner*—Donald P. Walsh
*Assistant Examiner*—Emmanuel M. Marcelo
*Attorney, Agent, or Firm*—Clyde E. Bailey, Sr.

[57] ABSTRACT

A vacuum box (38) is provided with recesses (86, 88, 90, 92) on the inner surfaces (74, 76) of its front and/or back walls (40, 42) along at least two of its interior corners (78, 80, 82, 84); so that, the pressures on opposite sides of the incoming and outgoing spans (64$_i$, 64$_o$) of the web (50) are substantially equalized at discrete locations along the lengths of the spans, whereby differential pressure applied to the central curved loop (64) between the spans causes the incoming and outgoing spans to remain substantially out of contact with the side walls (40, 42). The side walls (44, 46) may be provided with chamfers (154, 156) at the interior corners or bores (158; 166–172) and ports (160–164; 174–180) to facilitate equalization of the pressure to facilitate equalizing the pressure on opposite sides of webs having a transverse curl toward a centerline of the box. The box may include web keepers (102) to retain the web during thread-up and a removable, sound insulated closure (130). A method of operating such a vacuum box is taught.

15 Claims, 7 Drawing Sheets

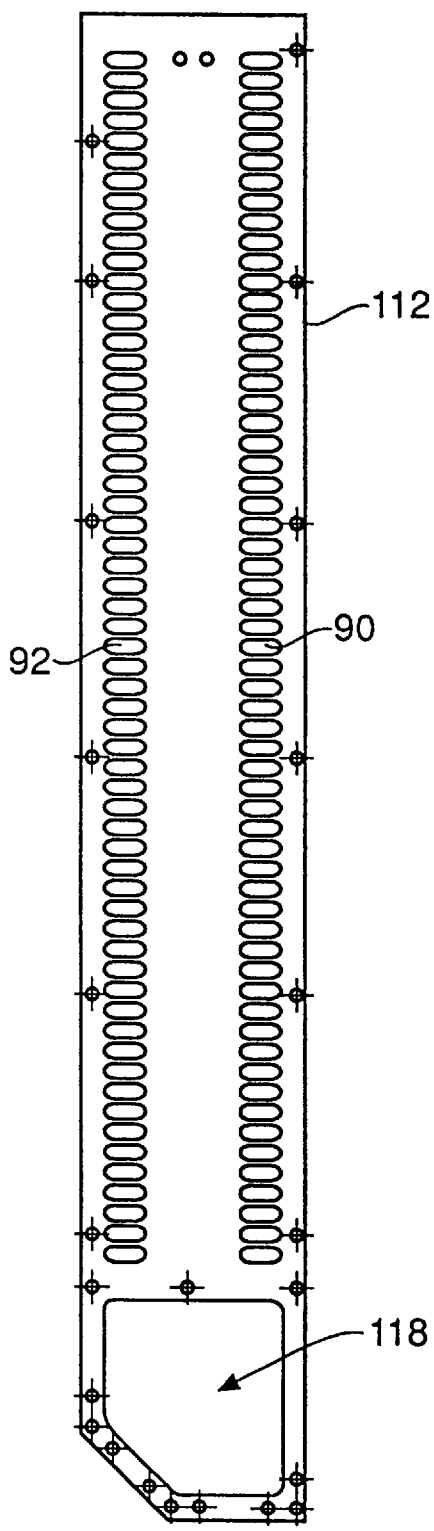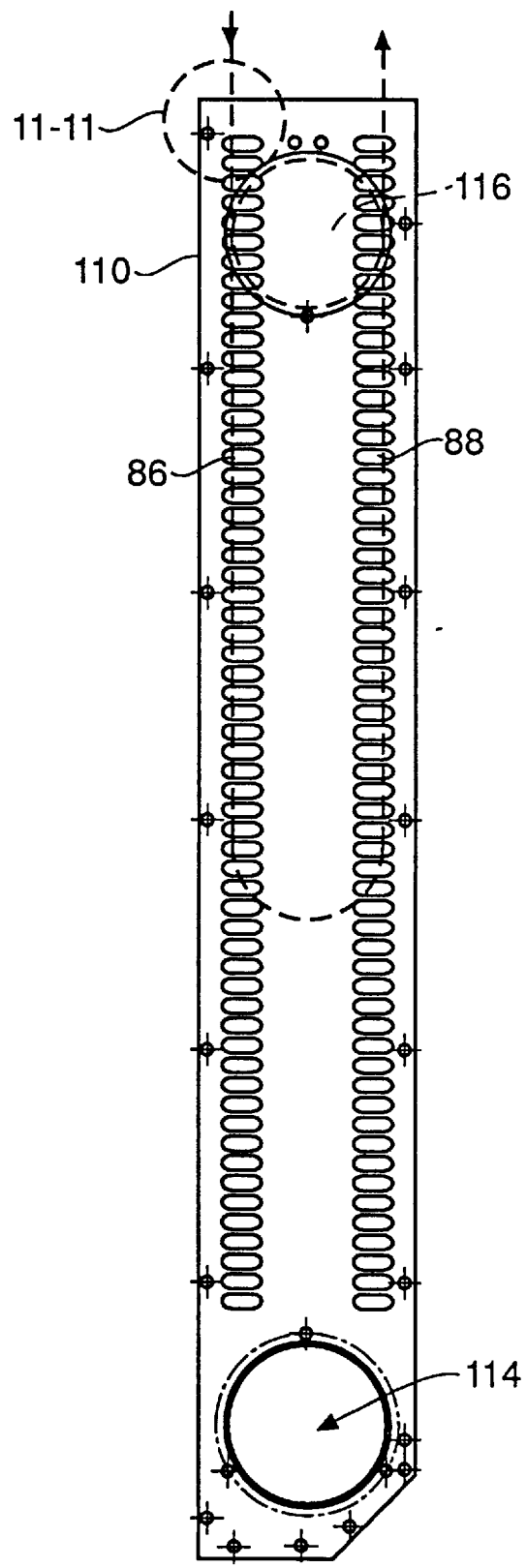
FIG. 9  FIG. 10

VACUUM BOX AND METHOD OF OPERATION FOR NON-CONTACT WEB TRANSPORT THEREIN

CROSS REFERENCE TO RELATED APPLICATION

This is a continuation of application U.S. Ser. No. 08/337,356, filed 10 Nov. 1994, now abandoned, which is a continuation-in-part of Ser. No. 08/169,445 filed 16 Dec. 1993 and abandoned upon filing of this application.

TECHNICAL FIELD

The invention concerns vacuum boxes and methods of operating such boxes. More particularly, the invention relates to a vacuum box for use in transport systems for relatively narrow webs, such as 16 to 35 mm photographic film, the vacuum box having features for preventing contact between the web and the side walls of the box.

BACKGROUND ART

Vacuum boxes have long been used in web transport systems both to control web tension and to store loops or lengths of web for release during intermittent operation. For example, such vacuum boxes have found particular application in transport systems for magnetic tapes where intermittent operation is common. Vacuum boxes have a distinct advantage over float roller accumulators in web transport systems that require high accelerations of the web. Because float roller systems have substantial mass, their considerable inertia can cause unwanted tension spikes in the web during periods of high acceleration or deceleration. Such variations in tension can lead to instabilities in some transport systems and can also cause damage to the web, such as scratches on photographic film. Since vacuum boxes have no moving parts, inertial effects are limited to movement of the mass of the web and the air within the box. So, vacuum boxes are widely used in web transport systems.

FIG. 1 illustrates schematically a conventional type of vacuum box 10 which in the familiar fashion comprises a back wall plate 12, a front wall plate 14, a pair of side wall plates 16, 18 and a bottom wall plate 20. Typically, plates 12 and 14 are parallel, as are plates 16 and 18, to define an interior volume of constant rectangular cross section which is open at its upper end. However, variations are known in which the space between the side walls decreases toward the bottom wall and in which the space between the front and back walls increases toward the bottom wall. In any event, all such boxes include a vacuum port 22 near the bottom end, through which air is withdrawn from the box during operation. A length of web 24, such as photographic film, is fed into the box over an infeed roller or air bar or driven vacuum drum or pinch roll 26 and withdrawn from the box over an outfeed roller or air bar or driven vacuum drum or pinch roll 28. The spacing between the front and back walls is chosen to be only slightly larger than the width of web 24; so that, when vacuum is applied through port 22, a differential pressure is applied across the web to draw the web into the box. Opposed pairs 30, 32, 34 of optical detectors may be used to monitor the position of the loop 36 which is formed in web 24 as it is drawn into the box.

In the illustrated vacuum box, rollers 26, 28 have been preferentially spaced inboard of the side walls of the box. As a result, the essentially straight ingoing and outgoing spans $36_i$, $36_o$ of the web are at an acute angle to the side walls, thus producing a sort of tear drop shape which helps to provide a clearance between the web and the surfaces of the side walls. In other known applications, the ingoing and outgoing spans may be nearly parallel to the side walls. In the illustrated arrangement, though, a loop 36 near the upper end of the box has a tangent angle $\alpha$ where the web begins to turn toward the center of the box. As a result, the transverse tension component X in web 24 tends to maintain a clearance to the side wall which may be about 0.020 inch (0.51 mm) in the case of 35 mm photographic film, for example. But, as loop 36 descends deeper into the box, a progressively smaller tangent angle $\beta$ is produced, thereby progressively reducing the transverse tension component X. So, the clearance to the side wall eventually disappears when the transverse tension component X cannot overcome the pressure differential across the web, particularly at lower tension levels in the transport system. For webs such as photographic film which may tend to curl transversely toward or away from the side walls after leaving infeed roller 26, the clearance to the side wall may disappear even more rapidly. Without such a clearance, sensitive webs such as photographic film are highly susceptible to scratching due to contact with the side walls. Various solutions to this type of problem have been proposed, such as applying jets of air through the side walls to maintain clearance; however, a simple, effective solution to the problem has been lacking.

Another problem with such known vacuum boxes is that the web within the box may vibrate rather strongly as loop 36 moves near the open end of the box, which not only may damage the web, but also causes considerable noise. And, as the tension in the web is increased, the levels of vibration and noise also tend to increase near the open end of the box. These effects can be reduced somewhat by reducing the size of angle $\alpha$; but maintaining clearance between the web and the side walls then becomes more difficult.

Still another difficulty with such known vacuum boxes concerns threading the box prior to starting the transport system. Typically, a length of the web has to be manually inserted into the box and manually held in place until vacuum is applied to port 22. Only when the loop has stabilized within the box can the operator release it and start the transport system. This process can require a considerable amount of operator-to-machine coordination and can be particularly difficult to perform if the web is sensitive to handling and must be threaded in low light conditions, as is the case for photographic film.

SUMMARY OF THE INVENTION

The primary objective of the invention is to provide an improved vacuum box and method of operating such a box to provide non-contact of the web with the side walls of the box. Other objectives are to simplify thread-up of the vacuum box and to reduce noise and vibration during operation. However, other desirable objectives and advantages inherently achieved by the disclosed invention may occur or become apparent to those skilled in the art. Nonetheless, the scope of the invention is to be limited only by the appended claims.

The invention is defined by the appended claims. A preferred embodiment comprises means for substantially equalizing the pressure on opposite sides of the incoming and outgoing spans of the web at discrete locations along the lengths of the spans, whereby differential pressure applied to the curved loop between the spans causes the spans to remain substantially out of contact with the side walls. The means for equalizing may include recesses spaced at discrete locations along the inside surfaces of the front and back walls, at the corners where the front and back walls meet the side walls. These recesses permit local equalizations of pressure across the incoming and outgoing spans of the web, which cause the web to remain away from the side walls of the box. As a result, in the case of 24 mm photographic film, it is possible to maintain a clearance of about 0.250 inch (6.4 mm) or greater along essentially the entire length of the vacuum box for both the ingoing and outgoing spans of the web. Similarly, a minimum gap of 0.090 inch (2.29 mm) can be maintained for 35 mm photographic film with the same recess geometry. The loop of web within the vacuum box need not be forced to a tear drop shape to maintain clearance as in some prior art applications and the generous clearance between the web and the side walls is essentially independent of the level of tension applied to the web by the vacuum box. That is, the generous clearance achieved in accordance with the invention essentially is not a function of tension in the web and remains essentially constant along the ingoing and outgoing spans even at very low tension in the web. This robust clearance helps to eliminate scratching of the web, which is particularly important for sensitive webs such as photographic film. Preferably, the web enters and leaves the vacuum box with a clearance to the side walls in the range of 0.260 to 0.500 inch (6.6 to 12.7 mm), to allow air to move freely between the web and the side walls toward the vacuum port at the lower end of the box. The recesses also help to reduce web vibration and noise level near the entrance to the box. Though reference is occasionally made in this specification to upper and lower ends of the vacuum box, those skilled in the art will appreciate that vacuum boxes in accordance with the invention may be oriented in practically any direction, assuming the weight of the loop of web is not sufficient to overcome the support provided by differential pressure across the web.

The recesses may be formed in the corners of both the front and back walls and for best performance should extend to the corners between the front and back walls and the side walls. The recesses in the front wall may be offset axially along the corners from the recesses in the back wall, preferably by a distance equal to one half the axial width of the recesses. The recesses may vary in axial width along the vacuum box. Preferably, the recesses extend beyond the corners of the vacuum box and are overlapped by the side walls. The recesses may be formed in the front and back walls only along two diagonally opposite corners. The recesses may slope toward one or the other end of the box. The recesses may have rounded ends or may be rectangular.

When webs having a transverse curl toward the center of the vacuum box are to be transported, the edges of the webs may contact the side walls of the vacuum box and lessen the effectiveness of the recesses. In a further embodiment of our invention, a chamfer may be extended axially along each side wall at each corner to facilitate equalizing the pressure on opposite sides of webs having such a transverse curl. Alternatively, a plurality of bores may be provided, one bore extending from each recess into an adjacent side wall and a plurality of ports extending from each bore into the box to facilitate equalizing the pressure. Or, a plurality of bores may be provided, each bore extending from each recess through an adjacent side wall to a recess in an opposite front or back wall and a plurality of ports extending from each bore into the box to facilitate equalizing the pressure.

Preferably, a pair of web keepers are located on the inside surfaces of the front and back walls of the vacuum box near the entrance to the box. The keepers enable the operator to easily place a loop of the web into the box simply by manually pushing the loop beyond the keepers. Once the web has passed the keepers, it springs beneath curved lower edges on the keepers and is retained in an initial loop position near the entrance to the box. The operator may then turn on the vacuum and the transport system without having to hold the web in place. Using optical or other position sensors to monitor the position of the loop within the box, the transport system can position the loop at a desired position within the box.

To further reduce noise levels, a transversely moveable closure may be provided across the entrance to the box, with slots for the ingoing and outgoing spans of the web. Between the slots, the closure may be provided with a hinged portion to permit the loop to be pulled from the box in the event of a malfunction. When this closure is used, the air supply to the top of the box may be provided through a stand-off conduit near the top of the box.

In accordance with the method of the invention, a web is transported through a vacuum box; and pressure is substantially equalized on opposite sides of the incoming and outgoing spans of the web at discrete locations along the lengths of the spans, whereby differential pressure applied to a curved loop of the web within the box causes the incoming and outgoing spans to remain substantially out of contact with the side walls. The discrete locations are located as in the case of the recesses in the apparatus of the invention.

Various advantages are provided by the invention. A steady, robust clearance may be maintained between the web and the side walls of the vacuum box along the length of the box above of the vacuum port, thereby minimizing potential for damaging the web during its movement through the vacuum box. The web may be retained within the vacuum box during thread-up without requiring the operator to hold the web in place by hand. Noise during operation may be reduced by closing the open end of the vacuum box. Also, web vibration within the box is substantially eliminated, thus minimizing noise due to such vibration.

BRIEF DESCRIPTION OF THE DRAWINGS

The foregoing and other objectives, features and advantages of the invention will be apparent from the following more particular description of the preferred embodiments of the invention, as illustrated in the accompanying drawings.

FIG. 9 shows an elevation view of the inside surface of a front plate of a vacuum box according to the invention.

FIG. 10 shows an elevation view of the inside surface of a back plate of a vacuum box according to the invention.

DESCRIPTION OF THE PREFERRED EMBODIMENTS

Figure 1:
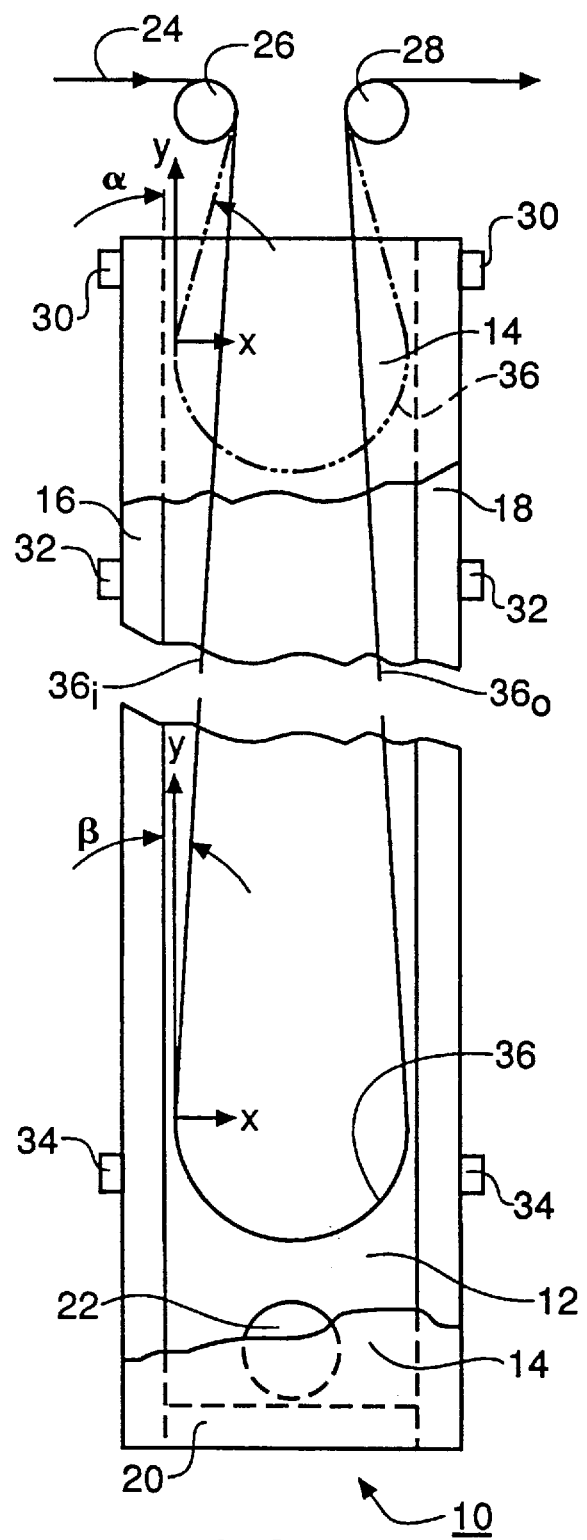
FIG. 1 shows an elevation view, partially broken away, of a known type of vacuum box.

The following is a detailed description of the preferred embodiments of the invention, reference being made to the drawings in which the same reference numerals identify the same elements of structure in each of the several Figures.

One embodiment of an improved vacuum box 38 according to the invention is illustrated in FIGS. 2 to 8. In the conventional manner, a back wall plate 40 and a front wall plate 42 are parallel; and a pair of parallel side wall plates 44, 46 extend between and perpendicular to the front and back wall plates. A bottom wall plate 47 closes one end of vacuum box 38. The plates may be made from any suitable material and may have any convenient thickness. Preferably, the spacing or width between the inside surfaces of the front and back walls 42, 40 is about 0.010 to 0.015 inch (0.25 to 0.38 mm) greater than the transverse width of the web for webs of photographic film. In theory, the spacing or length between side walls 44, 46, which governs the transverse dimension of the semicircular loop formed by the web within the box, may vary considerably depending on the amount of tension to be applied to the web. That is, the tension in the web is determined by the cross sectional area of the vacuum box multiplied by the pressure differential across the web and divided by two for the ingoing and outgoing spans of web. For webs having widths in the range of 16 to 35 mm, lengths between the side walls in the range of 4 to 7 inches (102 to 178 mm) have been used to produce web tension in the range of 0.25 to 1.5 pounds (0.113 to 0.680 kg). The depth of the box above the vacuum port establishes the maximum length of web that may be stored in the box and depths up to 48 inches (1.22 m) have been used with good results.

As illustrated in FIGS. 2 to 5, a vacuum port 48 is provided through back wall 40 near its lower end. A web 50 such as photographic film is fed into the box over an infeed roller, air bar or vacuum drum 52, for example, and leaves the box over an outfeed roller, vacuum drum or air bar 54. Preferably, web 50 enters and leaves the vacuum box with a clearance to the side walls in the range of 0.260 to 0.500 inch (6.6 to 12.7 mm), to allow air to move freely between the web and the side walls toward the vacuum port at the lower end of the box. As in the prior art vacuum box previously discussed, a plurality of optical detector pairs 56, 58, 60, 62 may be used to monitor the position within the box of a loop 64 formed in the web and provide information to the controller for the associated web transport system. In the illustrated embodiment, particularly when a subsequently to be described, optional closure 130 is used, air preferably is admitted to the box through an air inlet port 66 through the back wall. If closure mechanism 130 is not used, air is admitted through the open top of the box. A stand-off conduit 68 for application of vacuum and a stand-off conduit 70 for admission of air may be used to mount the vacuum box to a suitable robust face plate 72 or other support.

Figure 4:
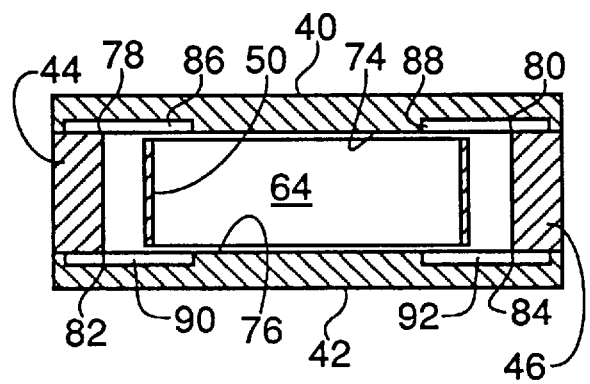
FIG. 4 shows a section view taken along line 4—4 of FIG. 2.
Figure 5:
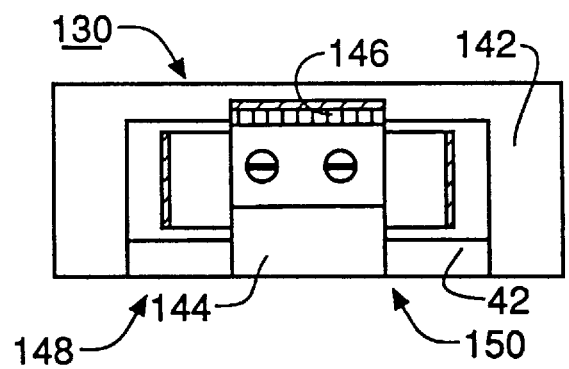
FIG. 5 shows a section view taken along line 5—5 of FIG. 3, but rotated to the same orientation as FIG. 4.

As seen best in FIG. 4, the inner surface 74 of back wall 40 and the inner surface 76 of front wall 42 meet the inner surfaces of the side walls 44, 46 to define back wall corners 78, 80 and front wall corners 82, 84. As illustrated, the preferred cross section of the vacuum box is rectangular with four flat inner surfaces meeting at four corners. However, it is also within the scope of our invention to provide outwardly bowed or concave inner surfaces on the side walls, not illustrated, thereby increasing the clearance between the web and the side walls. In accordance with the invention, a plurality of back wall recesses 86, 88 are provided at discrete, spaced locations along a substantial portion of the lengths of corners 78, 80; and a similar plurality of front wall recesses 90, 92 are provided at discrete, spaced locations along a substantial portion of the lengths of corners 82, 84. By "a substantial portion" is meant that the recesses preferably extend to about the level of the lowest position that the incoming and outgoing spans $64_i$, $64_o$ of loop 64 would be expected to reach during operation. Recesses 86, 88 and 90, 92 are believed to cause local equalizations of pressure across the relatively straight incoming and outgoing spans $64_i$, $64_o$ at discrete, spaced locations primarily above the curved portion of loop 64, thereby virtually eliminating a pressure differential along these spans which otherwise could cause them to move into contact with the side walls. This equalization apparently occurs due to flow of air from within the loop, through the recesses and into the clearance between spans $64_i$, $64_o$ and the side walls. However, because the recesses extend part way toward the center of the vacuum box, pressure equalization begins to occur at the transversely outer ends of the curved portion of loop 64 as they pass over one or two of the recesses. As a result, air flow past the central curved portion of loop 64 essentially is limited to passage through the small clearance with the front and back walls of the vacuum box. Therefore, substantially more downward force is exerted on the central curved portion of the loop than at the transversely outer ends of the central curved portion which pass over recesses. The resulting downward force on the central curved portion tends to hold web 50 away from the inside surfaces of side wall plates 44, 46.

In one embodiment of the vacuum box shown in FIGS. 2 to 5, the transverse width t of the side wall plates was about 0.5 inch (12.7 mm). Each recess could range in configuration from a circle to a slot with a diameter or transverse length l in the range of 0.75 to 1.25 inch (19.05 to 20.3 mm) for a vacuum box having a transverse width of about 5.0 inch (127 mm). Length l extended toward the center of the vacuum box sufficiently far to provide a smooth transition for the web as loop 64 moved up and down in the vacuum box. As illustrated, the transverse axis of the recesses was essentially normal to the centerline of the vacuum box. The axial width w of each recess was in the range of 0.25 to 3.0 inch (6.4 to 76.2 mm). Recesses with narrow axial widths caused the web to exhibit less transverse bouncing or "cogging" and less variation in tension as the web passed from recess to recess. The axial spacing s between recesses was in the range of 0.050 to 0.060 inch (1.3 to 1.5 mm). Preferably, the axial spacing s should be kept to the minimum which will allow for pressure equalization to occur more quickly at each recess and will reduce bouncing or "cogging". For ease of machining, circular ends were provided on the recesses. For 24 mm photographic film, the gap between the web and the side walls was observed to decrease somewhat when width w exceeded about 3.0 inches (76.2 mm). For the same photographic film, the depth of the recesses was in the range of 0.100 to 0.140 inch (2.54 to 3.56 mm). Deeper recesses would be needed for wider webs. Also for the same photographic film, each recess preferably extended to the adjacent corner. For recesses with curved ends, preferably the curved portions were overlapped by their adjacent side wall plates. This overlap helped to ensure ample pockets of atmospheric pressure at the transversely outer ends of the central curved portion of the loop. As a result, added assurance was given that atmospheric pressure was established on both sides of the straight spans of the web, as well as the transverse outer ends of the central curved portion, resulting in a substantial downward force in the center of the loop to pull the web way from and maintain a robust clearance to the side walls. Preferably, the recesses in the front wall were offset axially from those directly opposite in the back wall, which tended to reduce further tension spikes and variations in the web as it moved from one recess to the next. An offset of one half pitch was found to produce a minimum of web bouncing.

Figures 2, 3:
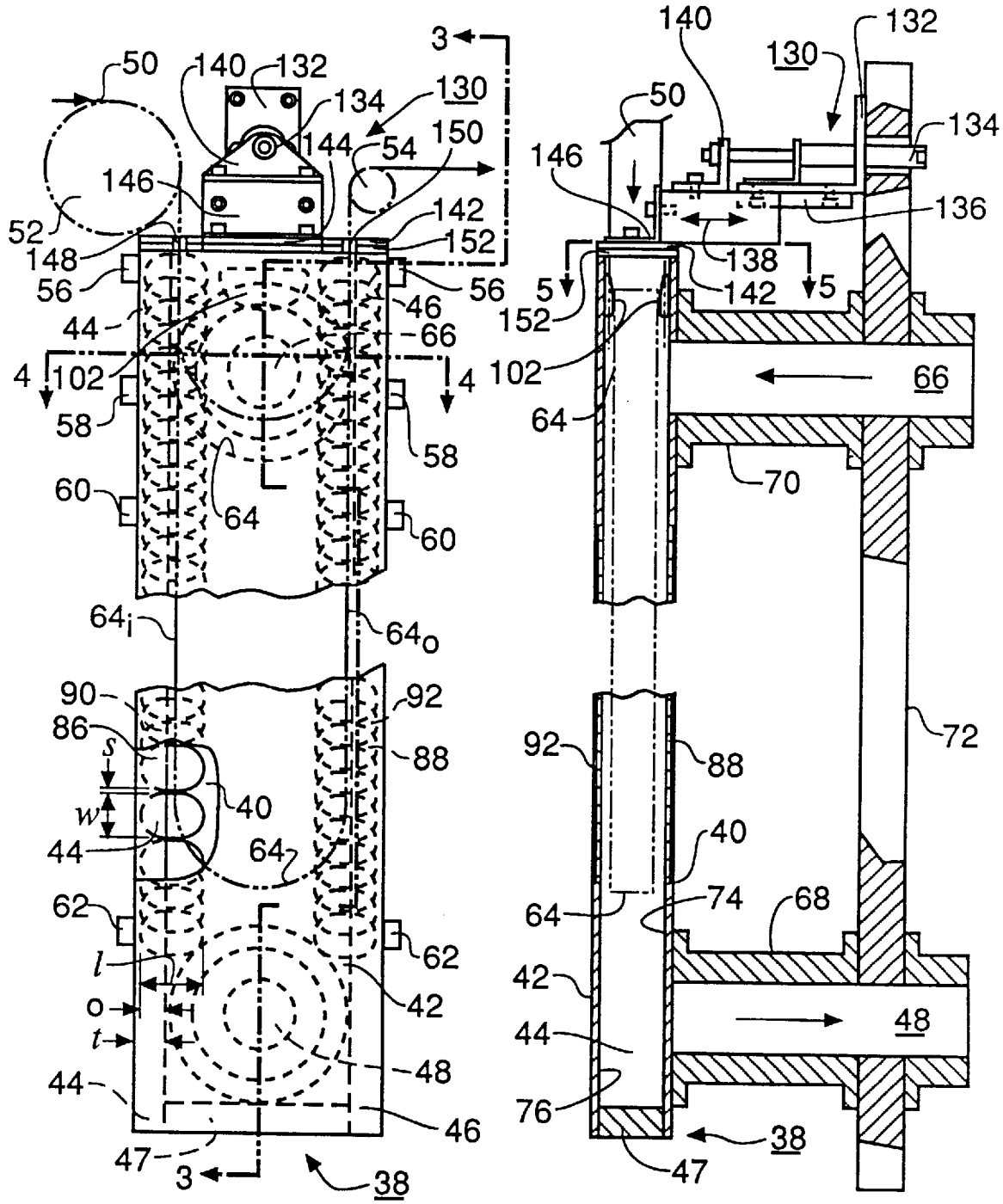
FIG. 2 shows an elevation view, partially broken away, of a vacuum box according to the invention.
FIG. 3 shows a section view taken along line 3—3 of FIG. 2.

The shape of the recesses shown in FIGS. 2 to 4 was not critical. Various recess geometries have been found effective to maintain an essentially constant clearance between a web and the side walls of the vacuum box. Circular recesses, rather than the elongated ones illustrated, prevented contact; however, the clearance between the web and the side walls tended to decrease somewhat as the web made a transition from recess to recess. That is, the clearance would increase and decrease as the web moved. This bouncing of the web also caused variations in tension which could be felt in the web as a sort of "cogging" effect. As transversely longer recesses were used, the level of tension in the web was decreased. The transverse length l of each recess also was chosen to ensure that the straight spans $64_i$, $64_o$ would pass recesses all along the length of the spans, to allow pressure equalization, even if the web were formed into a tear drop shape of the type illustrated in FIG. 1 but not so long as to substantially reduce tension. Preferably, the straight spans should pass over the transversely central portion of each recess. Those skilled in the art will appreciate that the side walls of the vacuum box may be non-parallel without departing from the scope of our invention.

Figure 11:
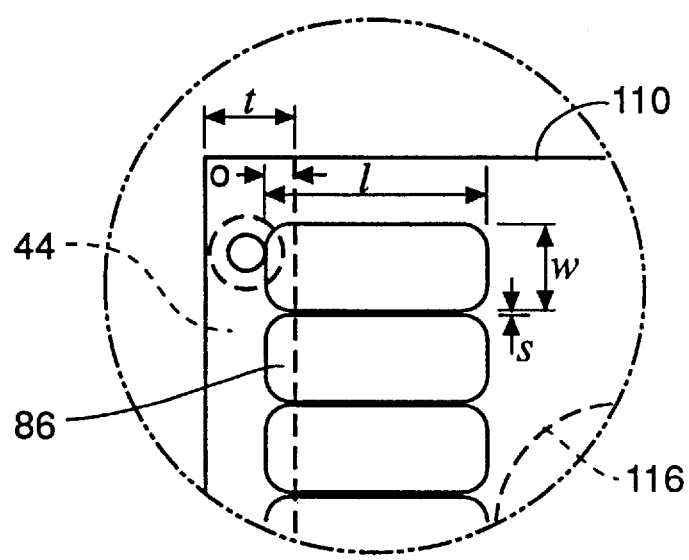
FIG. 11 shows an enlarged view of detail 11—11 of FIG. 10.

FIGS. 9 to 11 illustrate front and back wall plates and recess geometry for another embodiment of our invention. The back wall plate 110 and front wall plate 112 were used in a vacuum box having side wall plates and a bottom wall plate of the types previously discussed. In this embodiment, vacuum was applied through a vacuum port 114 in the back wall; however, air was admitted through the open end of the box. So, a mounting recess 116, shown in phantom lines, was used for attachment to a standoff similar to standoff 70 in FIG. 3, but without the central conduit. An access port 118 was provided in front wall 112 for use to clean out the bottom of the box, the port being closed with a suitable plate during operation.

The geometry of the recess shown in FIG. 11 was selected for ease of manufacture. In one actual embodiment, the transverse length l was in the range of 1.110 to 1.150 inch (28.2 to 29.2 mm); the axial width w, 0.455 to 0.455 inch (11.3 to 11.6 mm); the axial spacing s, 0.045 to 0.055 inch (1.14 to 1.40 mm); and the overlap o, 0.105 to 0.145 inch (2.67 to 3.68 mm) for a side wall thickness t of about 0.5 inch (12.7 mm). The corner radius was about 0.13 inch (3.3 mm) and the depth of the recesses was in the range of 0.100 to 0.140 inch (2.54 to 3.56 mm). Those skilled in the art will appreciate, however, that the dimensions of the recesses may vary considerably without departing from the scope of our invention.

Figure 12:
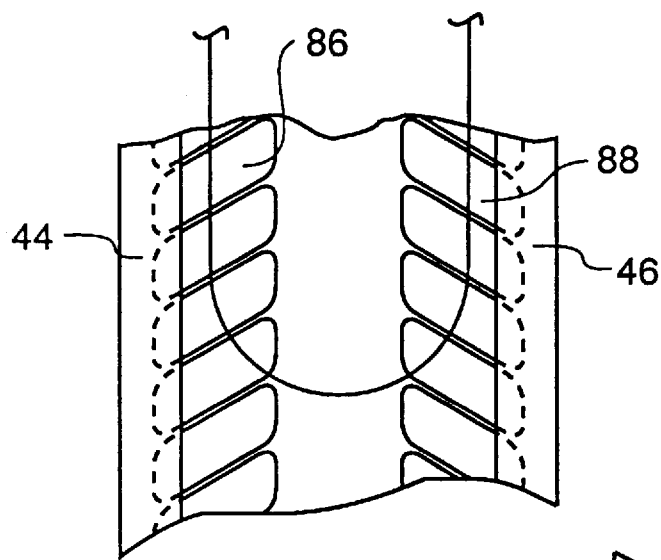
FIG. 12 shows a fragmentary elevation view, partially broken away, of a front or back plate including one alternative arrangement of the recesses according to the invention.
Figure 13:
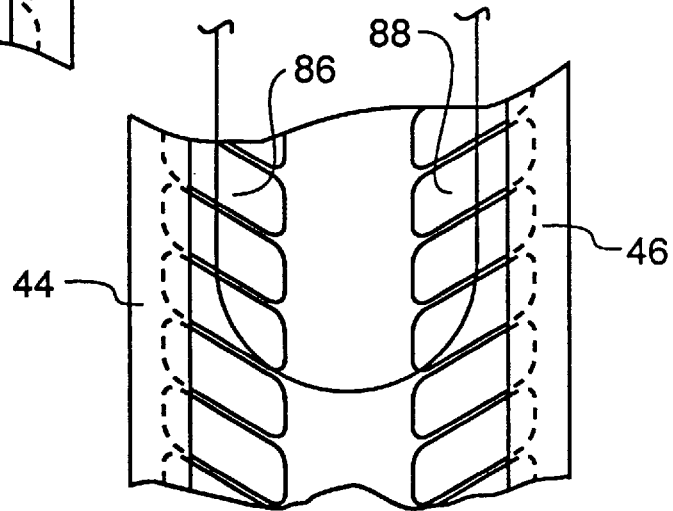
FIG. 13 shows a fragmentary elevation view, partially broken away, of a front or back plate including another alternative arrangement of the recesses according to the invention.

The corner radii of the recesses can range from none for a square corner to a radius equal to half the axial width of the recess, as shown in FIG. 2, for example. Recesses with very small corner radii or square corners tend to minimize web bouncing or "cogging" effects, when compared to recesses with larger radii. Although recesses with transverse edges essentially perpendicular to the straight spans of the web are preferred, edges slanted upstream or downstream also functioned satisfactorily. FIG. 12 shows still another embodiment in which the recesses at both corners of the front and back plates were shaped like parallelograms which sloped upward toward the center of the vacuum box. Though a vacuum box with such recesses functioned well, there appeared to be more leakage through the recesses and more noise than with the embodiment of FIG. 11. FIG. 13 shows yet another embodiment in which the recesses at both corners of the front and back plates again were shaped like parallelograms but were sloped downward toward the center of the vacuum box. A vacuum box with such recesses tended to exhibit more web bounce than with the embodiment of FIG. 11.

The depth of the recesses influences the width of the clearance which can be maintained between the straight spans of the web and the side walls. As the depth is reduced substantially below the range previously given, bleeding of air past the web becomes more and more restricted. This reduced flow may not be sufficient to equalize the pressure across the web. As a result, a smaller pressure differential may exist across the web which will reduce or close the clearance to the side walls. That is, as the depth of the recesses was reduced, the web behaved more like webs in conventional vacuum boxes. Those skilled in the art will appreciate that the optimum depth of the recesses in accordance with our invention also will vary depending on the width of the web.

The vacuum boxes of FIGS. 2 to 5 and 9 to 11 produced steady, robust clearances between 24 mm webs and the side walls, when there were rows of recesses in both corners of both the front and back wall plates. However, the vacuum box according to our invention also would perform well if recesses were located at the corners of only one wall plate; that is, only recesses 90, 92 or recesses 86, 88. And, the vacuum box according to our invention would perform well if one row of recesses were located on each wall plate in diagonally opposite corners of the vacuum box; that is, recesses 88, 90 or recesses 86, 92. In each of these alternative, somewhat less expensive arrangements, less air would be allowed to bleed past the straight spans of the loop and past the transversely outer ends of the central portion of the loop, which would tend to produce a smaller, but still robust, clearance to the side walls. A larger gap possibly could be obtained in such an event by increasing the depth of the recesses.

Figure 8:
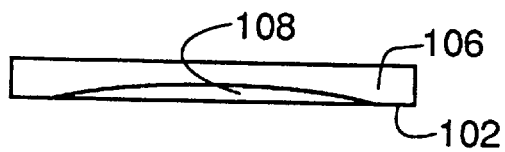
FIG. 8 shows a plan view of the keeper of FIG. 6.
Figure 6:
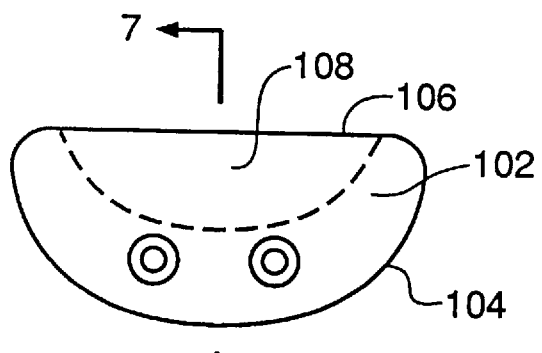
FIG. 6 shows an elevation view of a web keeper according to the invention.
Figure 7:
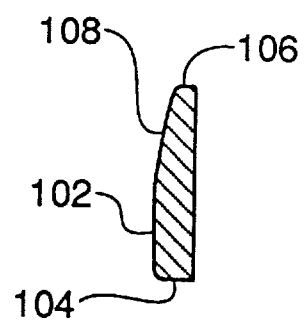
FIG. 7 shows a section view taken along line 7—7 of FIG. 6.

Referring now to FIGS. 6, 7 and 8, to hold the web within the vacuum box during thread-up and startup, a pair of web keepers 102 may be mounted centrally at the inlet ends of the front and back plates. Keepers 102 may be made from a material such as stainless steel having a transverse thickness in the range of 0.150 to 0.160 inch (3.81 to 4.06 mm). The lower edge 104 preferably is right circular cylindrical in geometry and, for 16 to 35 mm photographic film, may have a radius of curvature of about 0.875 inch (22.22 mm). The upper edge 106 may be straight and generally planar. To ease insertion of loop 64, a tapered, curved lead-in surface 108 may be provided, having a lead-in angle of about 10°. In use of the keeper, flow through port 48 is stopped and the web is manually pushed between keepers 102, which is aided by lead-in surfaces 108. Thread up of the associated web transport system is then completed. If the web needs to be repositioned along the transport system prior to applying vacuum to port 48, curved surfaces 104 will act as slides for the edges of the web, thus permitting the web to be pulled through the vacuum box. Keepers 102 might also be replaced with rotateable wheels; however, the wheels would have to be quite thin to permit ready insertion of the web. When vacuum again is applied to port 48, the loop will move away from the keepers into the vacuum box until its desired position is reached, as detected by photo cell pairs 30, 32, 34 and controlled by conventional means not illustrated.

As previously mentioned, vacuum boxes can be rather noisy. To reduce such noise level, the embodiment of FIGS. 2, 3 and 5 may include an optional closure mechanism 130. A bracket 132 is suitably attached to face plate 72 and supports a transversely extending pneumatic actuator 134. Beneath bracket 132 are supported a pair of tracks 136 which in turn support a slider 138. A rod end bracket 140 is mounted to slider 138 and connected to the end of the rod of actuator 134. Beneath slider 138 is supported a U-shaped closure frame member 142 which extends horizontally above the open upper end of the vacuum box. Between the arms of frame member 142 is positioned a rectangular door 144 which is pivoted to one end of slider 138 by a hinge 146. On either side of door 144, inlet and outlet slots 148, 150 are provided for passage of web 50. Preferably, the undersides of frame member 142 and door 144 each are provided with a layer 152 of sound deadening material which extends close to the open upper end of the vacuum box.

In operation of the closure mechanism, airflow through inlet port 66 is stopped by a suitable valve (not illustrated) and actuator 134 is retracted to the right, as viewed in FIG. 3; so that, the entire closure mechanism is moved away from the upper end of the vacuum box, leaving the front edges of frame member 142 and door 144 resting on the top edge of back wall plate 40. Web 50 is then threaded into the box in the manner previously described. A photocell pair may be used to confirm that the web is properly inserted. Vacuum is then applied through port 48 and air initially enters the vacuum box through its open upper end, due to inlet port 66's then being closed by the suitable valve. When the loop reaches a suitable position in the vacuum box, air is admitted through port 66 and actuator 134 is extended to return closure mechanism 138 to its illustrated closed position. Noise from the interior of the box is deadened by layer 152. Should the web transport system experience a malfunction which causes the loop of web to rise uncontrolled in the box, door 144 can flip aside on hinge 146 to allow the web to escape the vacuum box without breaking and without damaging the hardware of the closure.

Figure 14:
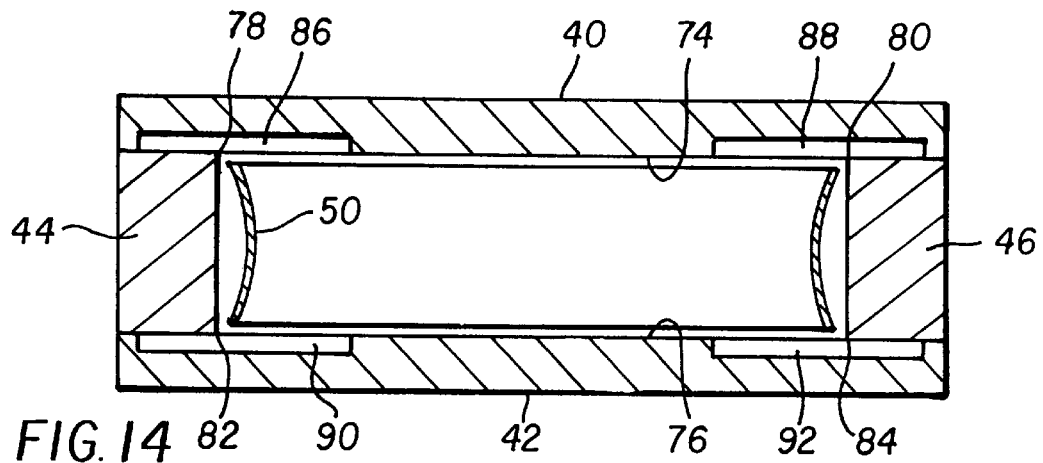
FIG. 14 shows an enlarged view along line 4—4 of FIG. 2, but with a web which curls transversely toward the centerline of the vacuum box.
Figure 15:
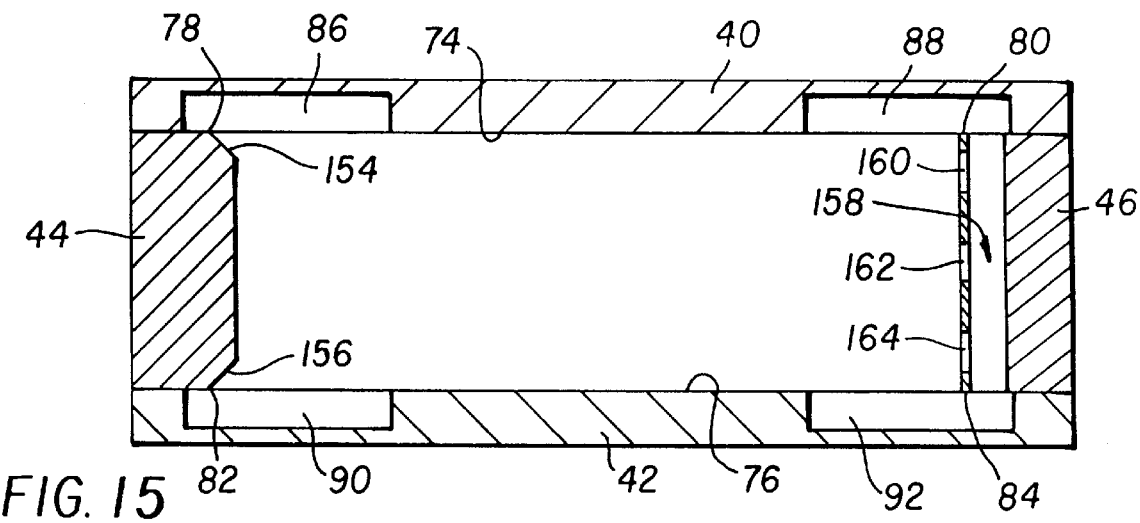
FIG. 15 shows a view similar to that of FIG. 14 in which the opposite side wall plates include alternative features to prevent contact of a transversely curled web of the type shown in FIG. 14.

FIG. 14 shows a vacuum box according to our invention through which a web having a transverse curl toward the centerline of the box is being transported. As indicated, the opposite edges of the curled web can come close to or actually contact the side wall plates, thus interfering with equalization of pressure on the opposite sides of the web. Lengthening and deepening recesses 86 to 92 will help to maintain a sufficient clearance between the web and side walls for many webs exhibiting such transverse curl. However, for webs having curl greater than 0.25 inch (6.35 mm), such adjustments may not be effective. FIG. 15 shows two alternative techniques for handling such curly webs.

Figure 16:
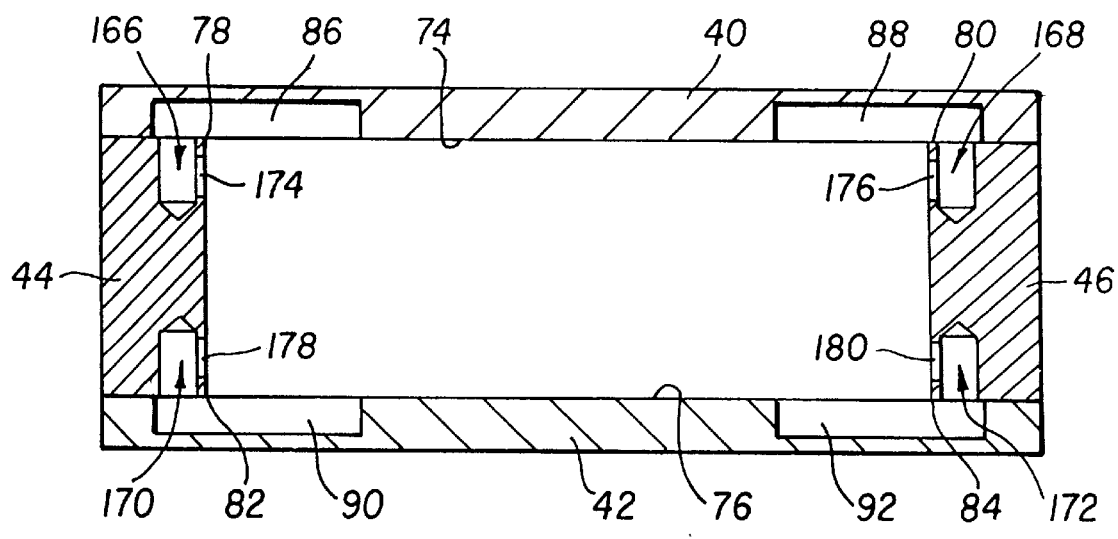
FIG. 16 shows a further view similar that of FIG. 14 in which the side wall plates include another feature to prevent contact of a transversely curled web of the type shown in FIG. 14.

Those skilled in the art will appreciate that in a given application, both side wall plates would be modified in essentially the same manner. Side wall plate 44 may be modified to include axially extending chamfer 154, 156 which provide sufficient clearance to the edges of such curly webs to facilitate equalization of pressure across the web and avoid contact with the side walls. Those skilled in the art will appreciate that chamfers 154, 156 could have a variety of angles and shapes, so long as the edges of the web are provided with the desired clearance. Alternatively, side wall plate 46 may be modified to include a plurality of axially spaced, transverse bores 158, each bore extending between an opposite pair of recesses 88, 92. A trio of ports 160, 162, 164 extend from each bore 158 into the box to facilitate equalization of pressure. FIG. 16 shows yet another technique for handling such curly webs. Each side wall plate may include a plurality of axially spaced, transversely extending blind bores 166, 168, 170, 172, each blind bore extending into the adjacent side wall plate from a respective one of recesses 86, 88, 90, 92. A corresponding plurality of ports 174, 176, 178, 180 extend from each respective blind bore into the box to facilitate equalization of pressure.

Parts List

10 . . . conventional vacuum box
12 . . . back wall plate
14 . . . front wall plate
16, 18 . . . side wall plates
20 . . . bottom wall plate
22 . . . vacuum port
24 . . . length of web
26 . . . infeed roller, air bar, driven vacuum drum or pinch roll
28 . . . outfeed roller, air bar, driven vacuum drum or pinch roll
30, 32, 34 . . . opposed pairs of optical detectors
36 . . . loop formed in web 24
$36_i$ . . . ingoing span of web 24
$36_o$ . . . outgoing span of web 24
$\alpha$ . . . tangent angle of web 24 to side wall plate near upper end of box
X . . . transverse tension component in web 24
$\beta$ . . . tangent angle of web 24 to side wall near bottom end of box
38 . . . improved vacuum box
40 . . . back wall plate
42 . . . front wall plate
44, 46 . . . side wall plates
47 . . . bottom wall plate
48 . . . vacuum port
50 . . . web
52 . . . infeed roller, air bar or vacuum drum
54 . . . outfeed roller, air bar or vacuum drum
56, 58, 60, 62 . . . opposed pairs of optical detectors
64 . . . loop of web 50
$64_i$ . . . incoming span of loop 64
$64_o$ . . . outgoing span of loop 64
66 . . . air inlet port
68 . . . stand-off conduit for application of vacuum
70 . . . stand-off conduit for admission of air
72 . . . face plate
74 . . . inner surface of back wall plate 40
76 . . . inner surface of front wall plate 42
78, 80 . . . back wall corners
82, 84 . . . front wall corners
86, 88 . . . back wall recesses
90, 92 . . . front wall recesses t . . . transverse width of side wall plates 44, 46
l . . . transverse length of recesses 82, 84, 86, 88
w . . . axial width of recesses
s . . . axial spacing between recesses
102 . . . web keeper
104 . . . lower edge of web keeper
106 . . . upper edge of web keeper
108 . . . tapered, curved lead-in surface of web keeper
110 . . . back wall plate
112 . . . front wall plate
114 . . . vacuum port
116 . . . mounting recess
118 . . . access port
130 . . . closure mechanism for vacuum box
132 . . . bracket
134 . . . pneumatic actuator
136 . . . tracks
138 . . . slider
140 . . . rod end bracket
142 . . . U-shaped closure frame member
144 . . . door
146 . . . hinge
148 . . . inlet slot
150 . . . outlet slot
152 . . . layer of sound-deadening material
154, 156 . . . axially extended chamfers on inside corners of side wall plates
158 . . . transverse bore through side wall plate between recesses
160, 162, 164 . . . ports from bore 158 into vacuum box
166, 168 . . . blind bores open to recesses 86, 88
170, 172 . . . blind bores open to recesses 90, 92
174, 176, 178, 180 . . . ports from blind bores into vacuum box While our invention has been shown and described with reference to particular embodiments thereof, those skilled in the art will understand that other variations in form and detail may be made without departing from the scope and spirit of our invention.

Having thus described our invention in sufficient detail to enable those skilled in the art to make and use it, we claim as new and desire to secure Letters Patent for:

1. In a vacuum box of the type including a front wall; a back wall, the front and back walls having inner surfaces facing each other; a pair of side walls extended between the front and back walls to define a cross section with at least four interior wall corners; means for guiding a length of web into and out of one end of the box, said box further having an inlet slot and outlet slot through which said of web is guided, the length having an incoming span, a central curved loop and an outgoing span, said central curved loop having a central portion and transverse outer ends opposite said central portion; and means for applying vacuum near an end opposite said inlet and outlet slots through which said length of web is guided, the improvement comprising:

means for substantially equalizing pressure along opposite front and back walls, said equalizing pressure permitting local equalization of pressure on opposite front and rear faces of the incoming and outgoing spans of the web proximate to recesses along the lengths of the spans, whereby more downward force is exerted on the central portion of the central curved loop than on the transverse outer ends of the central portion of the central curved loop which passes over said recesses thereby causing incoming and outgoing spans to remain substantially spaced from and out of contact with the side walls said means for equalizing comprising a plurality of recesses formed in the inner surface of at least one of the front and back walls, the recesses being spaced at discrete locations along substantially the length of the incoming and outgoing spans near the interior wall corners of the at least one wall.

2. The improvement of claim 1 wherein the recesses are formed in both of the front and back walls, and wherein each recess in said front wall is substantially opposite a recess in said back wall.

3. The improvement of claim 2, wherein the recesses have a width measured axially of the box and any one of said recesses in the front wall are offset axially one half of the width of said one recess from a substantially opposite recess in the back wall.

4. The improvement of claim 1, wherein the recesses extend beyond the interior walls corners of the at least one wall and are overlapped by the side walls.

5. The improvement of claim 1, wherein the recesses are formed in the front and back walls along a respective corner.

6. The improvement of claim 1, wherein the recesses slope toward the inlet end of the box.

7. The improvement of claim 1, wherein the recesses slope away from the inlet end of the box.

8. The improvement of claim 1, further comprising a chamfer extended axially along each side wall at each corner to facilitate equalizing the pressure on opposite sides of webs having a transverse curl toward a centerline of the box.

9. The improvement of claim 1, further comprising means mounted to the inner surfaces of the front and back walls near the one end of the box for engaging the curved loop to keep the length of web within the box.

10. The improvement of claim 1, further comprising a closure means for the one end of the box for reducing noise emanations from the box, the closure means comprising slots for passage of the incoming and outgoing spans.

11. The improvement of claim 10, further comprising means for moving the closure means away from the one end of the box.

12. The improvement of claim 10, wherein the closure means comprises a hinged door between the slots.

13. The improvement of claim 10, further comprising means for admitting air through one of the walls of the box near the one end.

14. In a vacuum box of the type including a front wall; a back wall, the front and back walls having inner surfaces facing each other; a pair of side walls extended between the front and back walls to define a cross section with at least four interior wall corners; means for guiding a length of web into and out of one end of the box, said box further having an inlet slot and outlet slot through which said of web is guided, the length having an incoming span, a central curved loop and an outgoing span, said central curved loop having a central portion and transverse outer ends opposite said central portion; and means for applying vacuum near an opposite end of the box, the improvement comprising:

means for substantially equalizing pressure along opposite front and back walls, said equalizing pressure permitting local equalization of pressure on opposite front and rear faces of the incoming and outgoing spans of the web proximate to recesses along the lengths of the spans, whereby more downward force is exerted on the central portion of the central curved loop than on the transverse outer ends of the central portion of the central curved loop which passes over said recesses thereby causing incoming and outgoing spans to remain substantially spaced from and out of contact with the side walls, said means for equalizing comprising a plurality of recesses formed in the inner surface of at least one of the front and back walls, the recesses being spaced at discrete locations along substantially the length of the incoming and outgoing spans near the interior wall corners of the at least one wall; and said means for equalizing further comprising a corresponding plurality of bores, one bore extending from each recess into an adjacent side wall and a port extending from each bore into the box to facilitate equalizing the pressure on opposite front and rear faces of webs having a transverse curl toward a centerline of the box.

15. In a vacuum box of the type including a front wall; a back wall, the front and back walls having inner surfaces facing each other; a pair of side walls extended between the front and back walls to define a cross section with at least four interior wall corners; means for guiding a length of web into and out of one end of the box, said box further having an inlet slot and outlet slot through which said of web is guided, the length having an incoming span, a central curved loop and an outgoing span, said central curved loop having a central portion and transverse outer ends opposite said central portion; and means for applying vacuum near an opposite end of the box, the improvement comprising:

means for substantially equalizing pressure along opposite front and back walls, said equalizing pressure permitting local equalization of pressure on opposite front and rear faces of the incoming and outgoing spans of the web proximate to recesses along the lengths of the spans, whereby more downward force is exerted on the central portion of the central curved loop than on the transverse outer ends of the central portion of the central curved loop which passes over said recesses thereby causing incoming and outgoing spans to remain substantially spaced from and out of contact with the side walls, said means for equalizing comprising a plurality of recesses formed in the inner surface of at least one of the front and back walls, the recesses being spaced at discrete locations along substantially the length of the incoming and outgoing spans near the interior wall corners of the at least one wall; and said means for equalizing further comprising a bore extending from each recess through an adjacent side wall to a recess in an opposite front or back wall and a plurality of ports extending from each bore into the box to facilitate equalizing the pressure on opposite front and rear faces of webs having a transverse curl toward a centerline of the box.

* * * * *